United States Patent [19]

Kimball

[11] 4,405,202
[45] Sep. 20, 1983

[54] PROTECTIVE MICROSCOPE CONTAINER WITH REMOTE CONTROL MECHANISM

[76] Inventor: Leonard L. Kimball, 1564 NE. 191 St., Miami, Fla. 33179

[21] Appl. No.: 248,695

[22] Filed: Mar. 30, 1981

[51] Int. Cl.$^3$ .................... G02B 21/00; G02B 21/34
[52] U.S. Cl. ........................... 350/589; 206/45.34; 350/529
[58] Field of Search ............... 350/65, 67, 61, 90, 350/8; 206/45.34

[56] References Cited

U.S. PATENT DOCUMENTS 3,393,032  7/1968  Crisler et al. .................. 350/67

FOREIGN PATENT DOCUMENTS 189980  10/1907  Fed. Rep. of Germany ........ 350/90

*Primary Examiner*—Jon W. Henry
*Attorney, Agent, or Firm*—Malin & Haley

[57] ABSTRACT

A protective microscope container for housing a microscope having a pair of focus control extension knobs extending therefrom and a pair of two dimensional slide holder control arms extending from the rear of the container. Two dimensional control members are used to drive a continuous slide holder over the viewing area of the microscope so that a plurality of specimen slides may be viewed without handling. The container also includes a light source and a support for a removable lens to provide different color viewing light depending on the nature of the specimen slides. The side walls of the container are hingedly mounted to the base of the container and can be easily opened to allow removal of the slide holder, specimen slides and the microscope if desired. In the preferred embodiment, the base of the container includes two generally planar surfaces hingedly mounted on their rear ends with a pair of thumb screws mounted in the top planar member in order to control the angle of the container relative to the lower base member as desired. Suction cups may be connected to the lower base member to secure the container to a table-top or the like.

9 Claims, 14 Drawing Figures

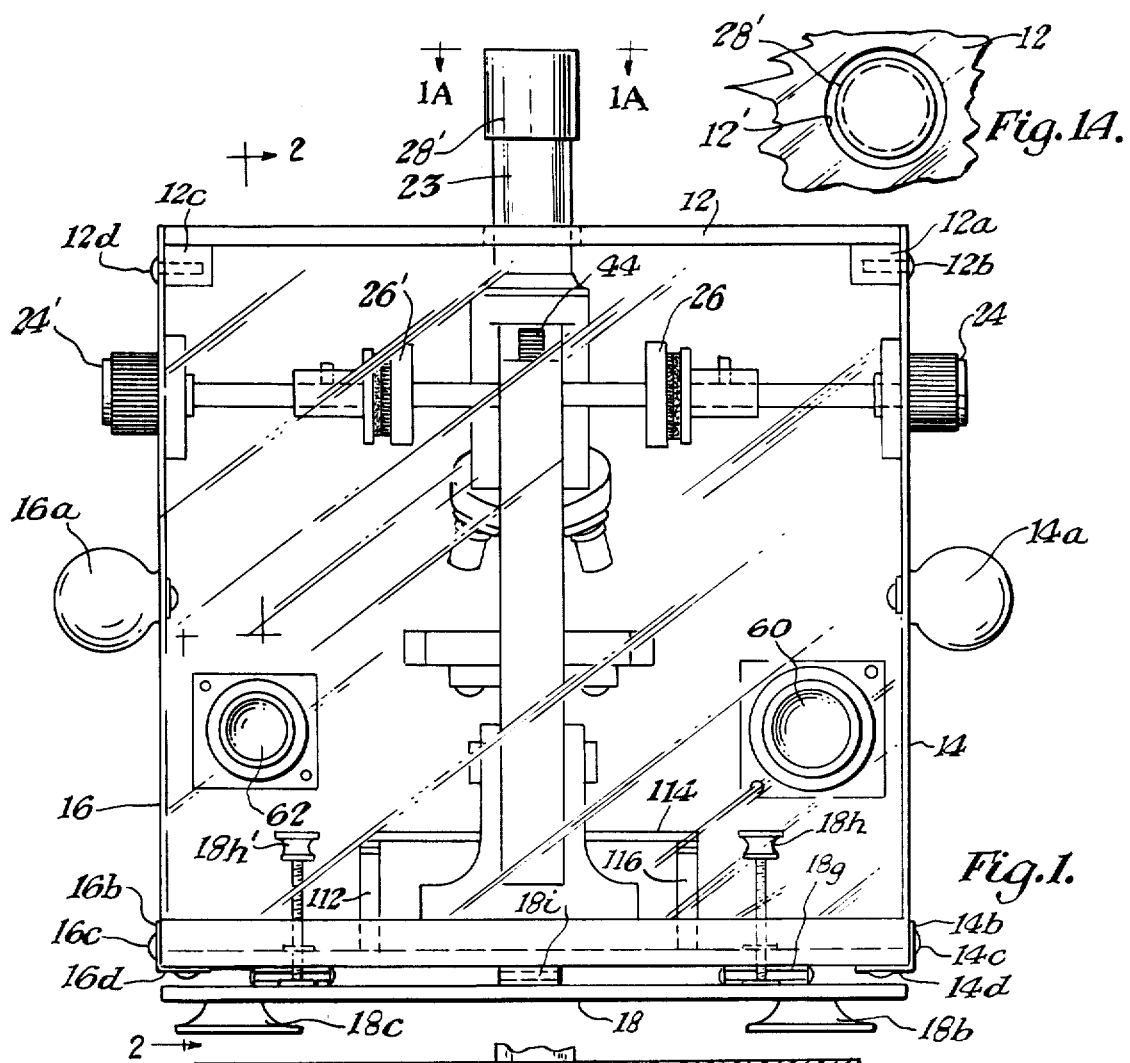
Fig. 1A.
Fig. 1.
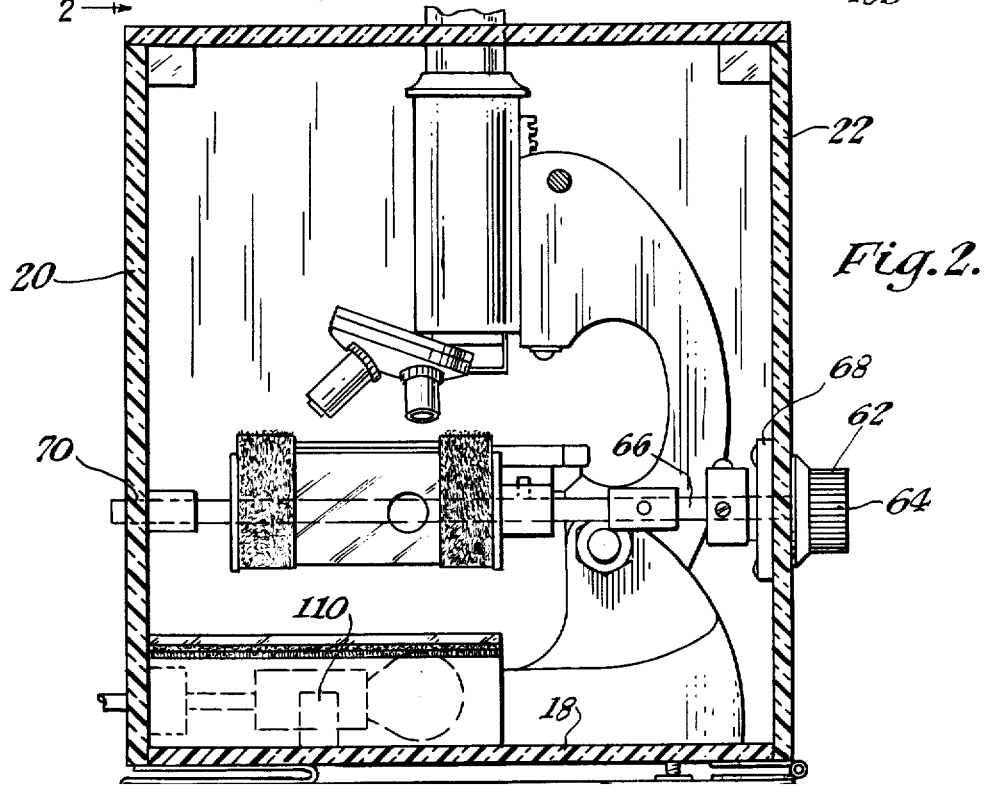
Fig. 2.

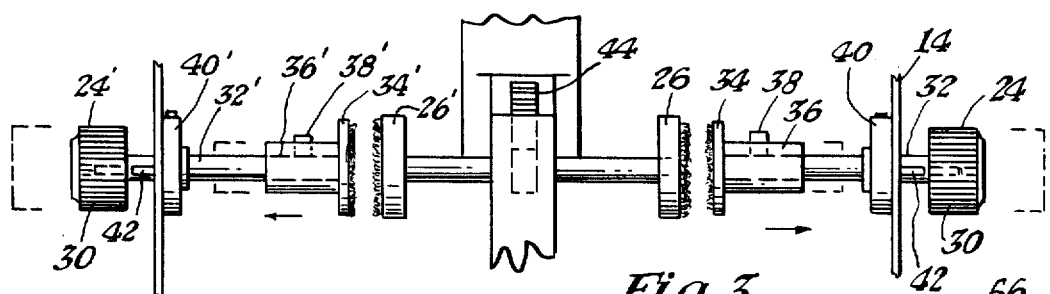
Fig.3.
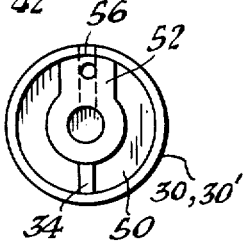
Fig.3A.
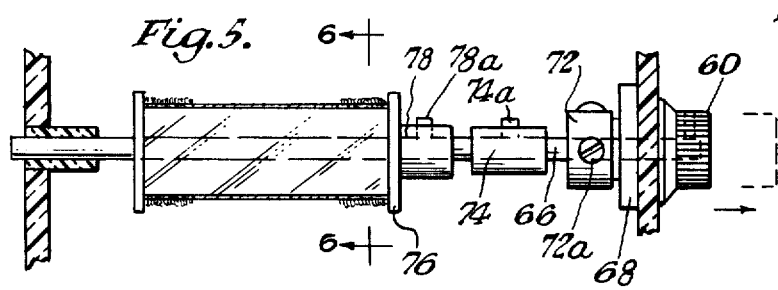
Fig.5.
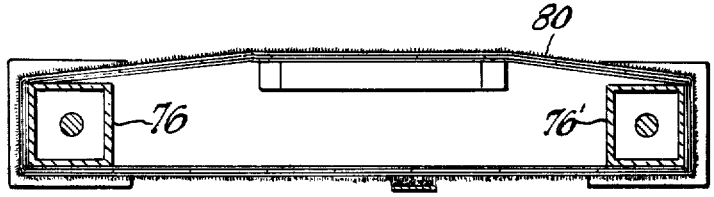
Fig.6.
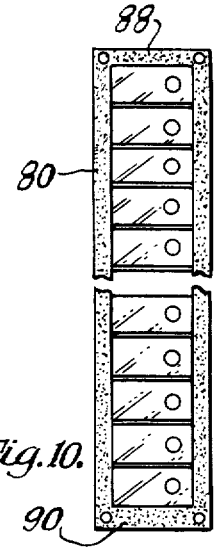
Fig.10.
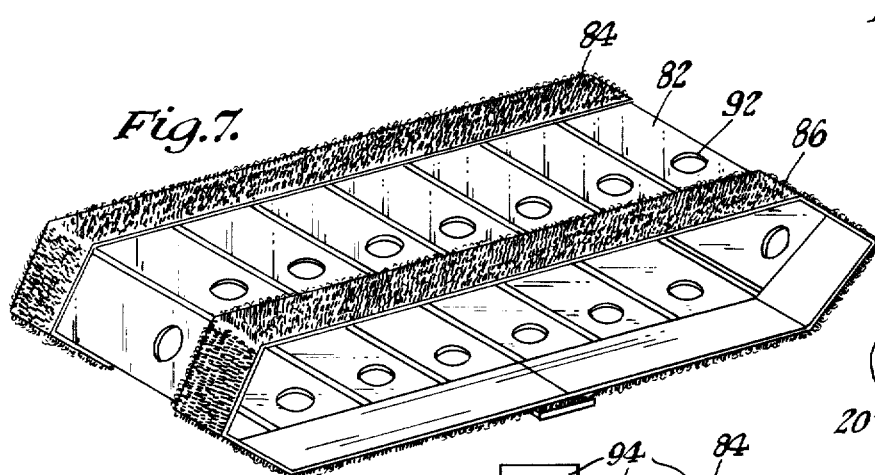
Fig.7.
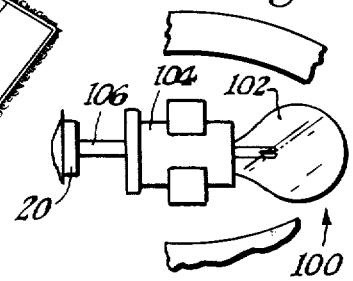
Fig.11.
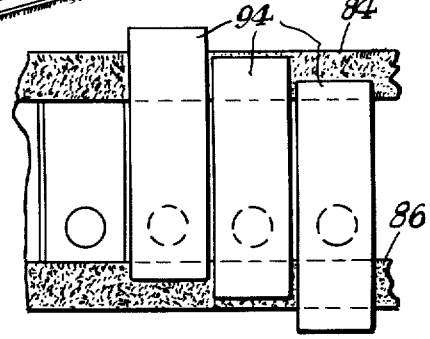
Fig.9.
Fig.8.

# 4,405,202

PROTECTIVE MICROSCOPE CONTAINER WITH REMOTE CONTROL MECHANISM

BACKGROUND OF THE INVENTION

This invention relates to microscopes and more particularly to a protective container for microscopes which enables external control of the focus control of the microscope and the viewing of multiple specimen slides without handling by the viewer.

In the past, in most educational environments specimen slides have been viewed by the student usually on an individual slide basis. The problems associated with this method have been that the constant handling of individual slides normally results in breakage of the slides and access to the microscope by the student has also resulted in damage to the microscope either by careless use or intentional damage. Therefore, an unwillingness on the part of school administrators to purchase microscopes and slides has arisen, resulting in the use of other types of audio-visual equipment. The students are therefore deprived of seeing the natural specimens through a microscope.

The present invention overcomes the aforementioned problem by providing a protective microscope container which allows for limited control of the microscope to prevent damage and also enables the viewer to examine a plurality of specimen slides at one time without actually handling of the specimen slides. Since the specimen slides are removably connectable to the slide holder, they can be changed at the discretion of the teacher or other authoritative person depending on the desired field of study.

SUMMARY OF THE INVENTION

According to the present invention a protective microscope container is presented.

The protective microscope container includes a transparent top wall, a pair of side walls hingedly connected to a base, a front wall and a rear wall. The walls are operably connected to each other in order to provide a housing for a microscope. The top wall also includes an aperture for receiving the eye piece of the microscope, somewhat greater in diameter than the eye piece of the microscope to also provide proper ventilation. Each side wall has a focus control extension knob extending therefrom which is connected to a extension shaft which is connectable to the focus knobs of the microscope by way of the mating members slidably connected to the extension shaft. The front wall and rear wall contain a pair of spaced apart slide holder control members slidably and rotatably mounted therein. The rear wall contains a slide control knob connected to each of the shafts for control of the slide holder. The slide holder is connected to respective drive members of each of the slide control shafts and is rotated by the slide shafts when the slide holder control knobs are rotated. Front and rear movement of the slide holder is also accommodated by sliding the shafts in their positions with the slide control knob. The two side walls may be moved out of there normal plane to allow changing of the slide holder and/or removal of the microscope as desired.

The base member of the container includes a pair of generally flat planar surfaces hingedly connected to each other at their rear ends. The front ends contain a flexible restraining strap which limits the movement of the planar surfaces away from each other. The base member also contains a plurality of stabilizing members, in the preferred embodiment represented by suction cups, to keep the container in stable relationship on a table top or the like.

It is therefore a primary object of this invention to provide a protective microscope container which allows multiple specimen slide viewing, while preventing unnecessary breakage and theft of the specimen slides and the microscope, ultimately saving money for the institutions who use such devices, and encouraging the continued and expanded use of the microscope.

It is another object of this invention to provide a protective microscope container which will enable students to view the actual scientific specimens on slides instead of reproductions of the specimens in other types of audio-visual aids which are becoming used more frequently because of the theft and breakage of the microscopes resulting from present methods of use of the microscope and slides.

It is still another object of this invention to provide a protective microscope container which enables two-dimensional control of a multiple slide holder, eliminating actual handling of the slides by the viewer.

It is yet another object of this invention to provide a protective microscope container which enables control of the focusing feature of the microscope external from the container.

It is a further object of this invention to provide a flexible, multiple slide holder, having removably connectable ends which are connected together to form a continuous slide holder when in use, the ends being disconnected when the slide holder is not in use.

It is still yet another object of this invention to provide a protective microscope container having a base which provides for angular control of the container, as necessary.

In accordance with these and other objects which will be apparent hereinafter, the instant invention will now be described with particular reference to the accompanying drawings.

BRIEF DESCRIPTION OF THE DRAWINGS

FIG. 1 is a rear view of the present invention.

FIG. 1A is a partial top view of the present invention.

FIG. 2 is a cross-sectional view of FIG. 1 taken across line 2 and looking in the direction of the arrows.

FIG. 3 is a detail view of the focus control extension members of the present invention.

FIG. 3A is a rear view of the focus control extension knob of FIG. 2.

FIG. 5 is a detail view of the two-dimensional control of the present invention.

FIG. 6 is a partial cross-sectional view of FIG. 5 taken across line 6 and looking in the direction of the arrows.

FIG. 7 is a perspective view of the specimen slide holder of the present invention, in the endless configuration.

FIG. 8 is an end view of a specimen slide.

FIG. 9 is a partial top view of the specimen slide holder with specimen slides attached thereto.

FIG. 10 is a top view of the specimen slide holder in the open position.

FIG. 11 is a detail view of the light source of the present invention.

DESCRIPTION OF THE PREFERRED EMBODIMENT

Figure 4:
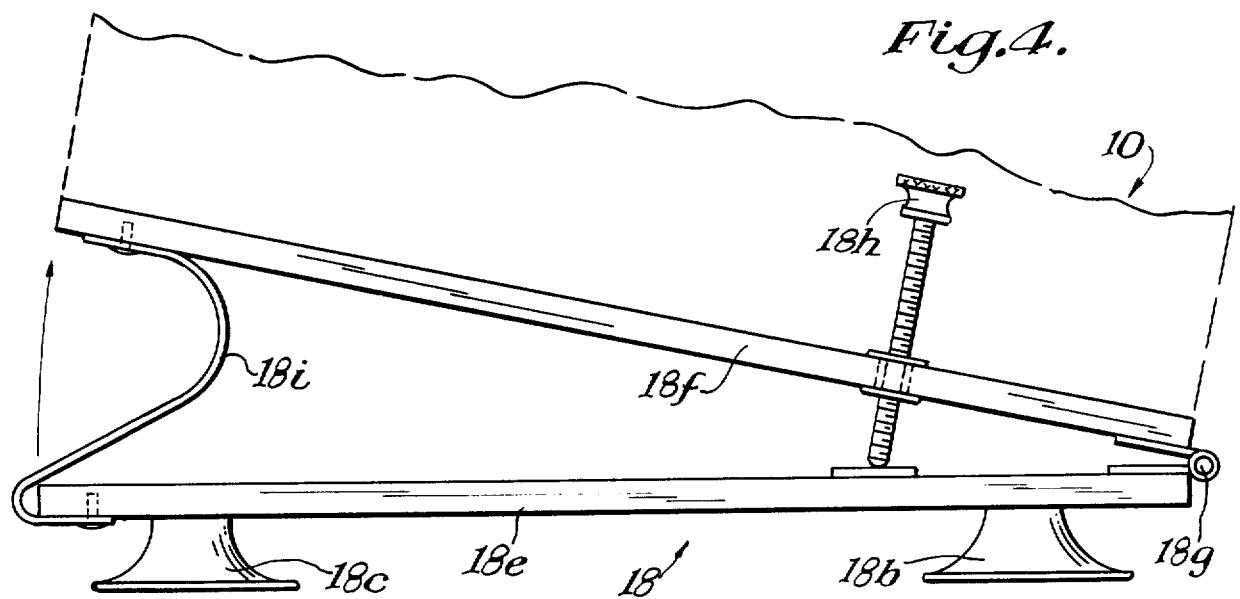
FIG. 4 is a side view of the preferred embodiment of the base of the present invention.

Referring now to the drawings, and more particularly to FIGS. 1, 1A, 2 and 3 a protective microscope container is shown generally at 10 and includes a transparent top 12, the side walls 14 and 16, the base 18, the front wall 20 and the rear wall 22. The front wall 20 and the rear wall 22 have their lower ends glued to the base 18, although other fastening methods, such as screws, well known in the art could be used. The side walls 14 and 16 are connected to the base 18 by the respective flexible hinge members 14b and 16b. The hinge member 14b has one end connected to the side wall 14 by the bolt 14c and the other end connected to the base 18 by the bolt 14d. The hinge member 16b has one end connected to the side wall 16 by the bolt 16c and the other end connected to the base 18 by the bolt 16d. Grasping knobs 16a and 14a may be used to move the side walls or to grasp the container 10 when moving is necessary.

The top wall 12 has four connecting blocks 12a, 12c, 12a' (not shown), and 12c' which include threaded apertures for receiving the respective bolts 12b, 12d, 12b' (not shown) and 12d' (not shown) which are used to secure the respective side walls 14 and 16. The connecting blocks 12a, 12c, 12a' and 12c' are fixed to the top wall 12 by glue, however other connecting means well known in the art could be used.

As can be seen in FIG. 1A, the eye piece 28 of the microscope extends through the aperture 12' in the top wall 12. The aperture 12' is greater in diameter than the eye piece 28' to provide additional ventilation. Projecting through apertures in the side walls 14 and 16 are the respective focus control extension arms 24 and 24'. Focus control extension arms 24 and 24' are removably connectable to the respective focus control knobs 26 and 26' of the microscope 28. The focus control extension arms 24 and 24' include the extension control knobs 30 and 30' which are slidably engageable with the respective extension shafts 32 and 32'. The mating plates 34 and 34' include the respective sleeves 36 and 36' which slidably receives a respective extension shaft 32 and 32' so that the plates 34 and 34' are variably extendable to meet with the respective focusing knobs 26 and 26'. Set screws 38 and 38' are used to tighten the respective sleeves 36 and 36' to the respective shaft 32 and 32' when the mating plates 34 and 34' are in proper positions as shown in FIG. 1. In the preferred embodiment the mating plates 34 and 34' are connected to the respective knobs 26 and 26' by using engageable loop and hook material such as "velcro" or "scotch mate", although other removable connecting means could be used. Locking sleeves 40 and 40' are also slidably connected to the respective shafts 32 and 32' and locked in place to prevent longitudinal movement of the focus control extension arms 24 and 24' once they are in place.

The side walls 14 and 16 include respective locking pins 42 and 42' which are used to control the limits of rotation of the focus knobs 26 and 26' to prevent damage to the focusing gear 44 of the microscope. As can be seen in FIG. 3A each of the knobs 24 and 24' would include a guiding slot 50, terminated at predetermined locations by the stop bars 52 and 54, which slidably engage a respective locking pin 42 or 42'. A set screw 56 can then be tightened down after the knob 30 and 30' is rotated to a preset position relative to the locking pin 42 and 42' to limit the rotational movement of the knob 30 and 30' to prevent jamming of the gear 44 which could be done if full rotational movement was allowed.

Figure 4A:
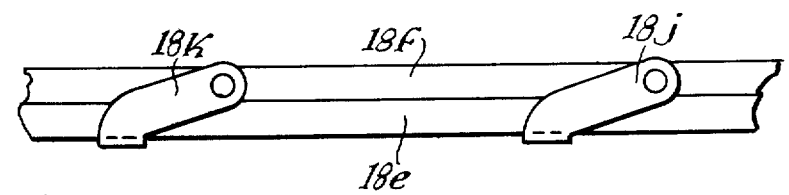
FIG. 4A is a partial front view of FIG. 4.

Referring now to FIGS. 1, 2, 4 and 4A the base 18 of the container 10 is shown. In the preferred embodiment, the base 18 comprises a first planar body 18e hingedly connected to a second planar body 18f by way of the hinge 18g. A thumb wheel bolt 18h is threadingly connected through the second planar body 18f in order to regulate the angle of elevation of the second planar body 18f relative to the first planar surface 18e. A restraining strap 18i limits the angle between the first planar body 18e and the second planar body 18f and is normally designed to prevent the container with the microscope therein from tipping all the way over. The restraining clips 18j and 18k (rotatably mounted to the second planar body 18f, by bolts, rivets, or screws and the like), retain the first planar body 18e in coplanar abutting relationship with the second planar body 18f for moving the container 10 when necessary. Suction cups 18b, 18c and 18a and 18d (not shown) are also affixed to the bottom of the first planar body 18e and prevent sliding movement of the container 10 when it is placed in a desired position and location. The base 18 enables the eye piece of the microscope to be placed in the proper angular relationship to the eye of the user as necessary. In an alternate embodiment (not shown) of the base 18, a single piece thereby not allowing angular positioning of the protective container 10 could be used. Again the suction cups 18a, 18b, 18c and 18d would be fixed to the bottom of the base.

Referring now to FIGS. 1, 2, 5 and 6, the two-dimensional controls 60 and 62 are shown. The two-dimensional controls 60 and 62 are identical and operate in the same manner. The two-dimensional control 62 includes an adjusting knob 64 connected to the control shaft 66 which passes through the bushing 68 in the rear wall 22 and the bushing 70 in the front wall 20. The shaft 66 can both slide rearwardly and forwardly in the bushings 68 and 70, as well as rotate and therefore two dimensional control is acquired. However, forward and rearward sliding movement of the shaft 66 can be prohibited by tightening the set screws 72a of the set screw holder 72 with the set screw holder 72 in a position abutting the bushing 68. However when forward or rearward movement is desired, the sleeve 74 with set screw 74a can be locked in position along the shaft 66 to set the parameters of forward and rearward movement as desired. A drive member 76 is slidably received by the shaft 66 and on one end has a locking sleeve 78 with associated set screw 78a affixed thereto in order to lock the driving member 76 in the desired position along the shaft 66. In the preferred embodiment the driving members 76 and 76' are square for reasons more fully described hereinafter, although other compatible shapes could be used.

Referring now to FIGS. 6 through 10 a removable slide belt is shown generally at 80 and comprises a plurality of specimen slide mounting members 82 connected at their respective ends to both of the flexible belts 84 and 86. In the preferred embodiment the belts are made from engageable loop and hook material such as "velcro" or "scotch mate", although other removable connecting means well known in the art may be used and are fastened to the mounting members 82 by an adhesive. The distal end 88 of the removable drive belt 80 is connectable to the proximal end 90 of the belt 80 through the use of a velcro connection in order to form a continuous belt around the driving members 76 and 76' (see FIGS. 6 and 7).

Each of the specimen slide holders 82 contain an aperture 92 in order that light may pass through the specimen slide holder 82 to illuminate the specimen mounted on a slide for viewing by the microscope and prevent accumulation of dust and dirt under the specimen on prepared slide.

As shown in FIG. 8 each of the slides 94 has engageable loop and hook material such as "velcro" or "scotch mate" or other removable connecting means well known in the art 96 adhered to the bottom of each of its ends in order that the slide may be positioned on the slide holder 82, such that the specimen is in alignment with the microscope. FIG. 9 illustrates that the slide may be positioned so that either of the ends may extend past the edge of the loop and hook material belts 84 and 86 because the edges of the drive members 76 and 76' are designed not to interfere with the edge of the drive belt thereabove. Prior to using, the loop and hook material connects to the ends of the slide to mate with the loop and hook material belts 84 and 86. The slides can be properly positioned so that the specimen on the slide is in alignment with the apertures 92 for maximum illumination and in alignment with the microscope for proper viewing. As can be seen the specimen slide belt can be disconnected from its continuous belt embodiment and hung up for storage.

Referring now to FIGS. 1, 2 and 11 the illuminating source is shown generally at 100 and includes the bulb 102, the socket 104 with associated electrical cord 106 which passes through the aperture 108 in the wall 20 to be connected to an electrical power source (not shown). The socket 104 is held in place by the clamp 110 connected to the base 18 of the device 10. On either side of the illuminating source 100 are the support members 110 and 112 which support the illuminating source lens cover 114. The lens 114 is removably connected to the support members 110 and 112 by loop and hook material such as "velcro" and "scotch mate" or other removable connecting means well known in the art in the preferred embodiment, although other removable connecting means well known in the art may be used. Removable lens 114 is essential to viewing slides as different types of specimens require different color lenses.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A protective microscope container for housing a microscope having an eyepiece, a slide viewing support and a focus control, comprising:
    a transparent top wall having an aperture for receiving said eyepiece and ventilating the inside of said container;
    a front wall and rear wall;
    a base for supporting said microscope;
    a first side wall and a second side wall;
    said top wall, front wall, rear wall, base, first side wall and second side wall, operably connected together whereby limited access to the inside of said container can be obtained without dismantling a wall or said base
    focus control extension means for focusing said microscope externally of said container, operably connected to said container;
    first connecting means for removably connecting said focus control extension means to said focus control;
    moveable slide holder for receiving at least one specimen slide;
    second connecting means for connecting said specimen slide to said slide holder;
    two-dimensional drive means for controlling both the longitudinal and transverse position of said slide holder relative to said eyepiece;
    said slide holder operably connected to said two-dimensional drive means for viewing of specimen slides;
    light source for viewing said specimen slides, operably connected to said container below said slide viewing support;
    lens means for changing the color or intensity of light from said light source, positionable between said light source and said specimen slides;
    lens support means for supporting said lens means, operably connected to said container;
    third connecting means for removably connecting said lens means to said lens support means.

2. A protective microscope container as set forth in claim 1, further comprising:
    stabilizing means for securing said container to a top, connected to said container.

3. A protective microscope container as set forth in claim 2, wherein:
    said base including a first planar member and a second planar member, said first planar member hingedly connected to said second planar member at common ends, restraining means for limiting movement of said first planar member relative to said second planar member;
    said stabilizing means includes a plurality of suction cups connected to said base.

4. A protective microscope container as set forth in claim 3, wherein:
    said focus control extension means includes an extension shaft rotatably connected through a selected side wall, extension control knob connected to said extension shaft, external of said side wall, a mating plate slidably connected to said extension shaft internal of said side wall in alignment with said focus control;
    said side wall having locking means engageable with said extension control knob for limiting rotation of said extension shaft.

5. A protective microscope container as set forth in claim 4, wherein:
    said first connecting means is an engageable loop and hook material, connected to said focus control and said mating plate.

6. A protective microscope container as set forth in claim 5, wherein:
    said slide holder includes a plurality of specimen slide mounting members, each said member having its ends connected to a flexible belt;
    said slide holder having a distal end and a proximal end, said distal end removably connectable to said proximal end to form a continuous slide holder.

7. A protective microscope container as set forth in claim 6, wherein:

said two-dimensional drive means includes a pair of control shafts in spaced apart relation, each having a front end rotatably and slidably mounted in said front wall and a rear end rotatably and slidably mounted in said rear wall and extending therethrough;

each said control shaft having a slide control means for controlling sliding movement of said shaft, and a drive member to receive and drive said slide holder without interferring with said drive member, each said drive member sized and shaped to engage with said slide holder to control rotational movement of said slide holder.

8. A protective microscope container as set forth in claim 7, wherein:

said second connecting means is an engageable loop and hook material.

9. A protective microscope container as set forth in claim 8, wherein:

said third connecting means is an engageable loop and hook material.

* * * * *